United States Patent
Martin San Lorenzo et al.

(10) Patent No.: US 6,869,520 B1
(45) Date of Patent: Mar. 22, 2005

(54) PROCESS FOR THE CONTINUOUS PRODUCTION OF HIGH PURITY ELECTROLYTIC ZINC OR ZINC COMPOUNDS FROM ZINC PRIMARY OR SECONDARY RAW MATERIALS

(75) Inventors: Daniel Martin San Lorenzo, Madrid (ES); Gustavo Diaz Nogueira, Madrid (ES); Miguel Angel Garcia Leon, Madrid (ES)

(73) Assignee: Tecnicas Reunidas S. A., Madrid (ES)

( * ) Notice: Subject to any disclaimer, the term of this patent is extended or adjusted under 35 U.S.C. 154(b) by 68 days.

(21) Appl. No.: 10/170,134

(22) Filed: Jun. 12, 2002

(51) Int. Cl.[7] .............................. C25C 1/16; C25G 11/00
(52) U.S. Cl. ........................ 205/605; 423/101; 423/109
(58) Field of Search ................................ 205/602–608; 423/99, 101, 109

(56) References Cited

U.S. PATENT DOCUMENTS

| | | | |
|---|---|---|---|
| 3,905,882 A | * | 9/1975 | Hudson et al. ............. 205/607 |
| 4,124,462 A | | 11/1978 | Reinhardt et al. |
| 4,260,722 A | | 4/1981 | Pfleger et al. |
| 4,401,531 A | | 8/1983 | Martin San Lorenzo et al. |
| 4,552,629 A | | 11/1985 | Duyvesteyn et al. |
| 4,557,908 A | * | 12/1985 | Laveyne et al. ............. 423/164 |
| 4,572,771 A | | 2/1986 | Duyvesteyn et al. |
| 5,858,315 A | * | 1/1999 | Van Put et al. ............. 423/109 |

FOREIGN PATENT DOCUMENTS

| | | |
|---|---|---|
| EP | 356136 | 2/1990 |
| WO | WO 9814623 | 4/1998 |

* cited by examiner

*Primary Examiner*—Donald R. Valentine
(74) *Attorney, Agent, or Firm*—John McMahon

(57) ABSTRACT

The invention relates to a process involving the following steps: a) performing leaching of the raw material with an acid aqueous solution to dissolve the zinc if said raw material is a solid; b) optionally performing solid-liquid separation; c) neutralizing the aqueous solution once the zinc-containing raw material is in liquid form; d) performing solid-liquid separation of the solution rich in zinc from the solids precipitated during the neutralization step; e) extracting the zinc using an acid organic solvent; f) purifying the organic solvent from the extraction step; g) re-extracting zinc from the organic solvent using an acid aqueous solution; h) recovering the zinc by electrolysis and/or crystallization and/or precipitation.

30 Claims, 1 Drawing Sheet

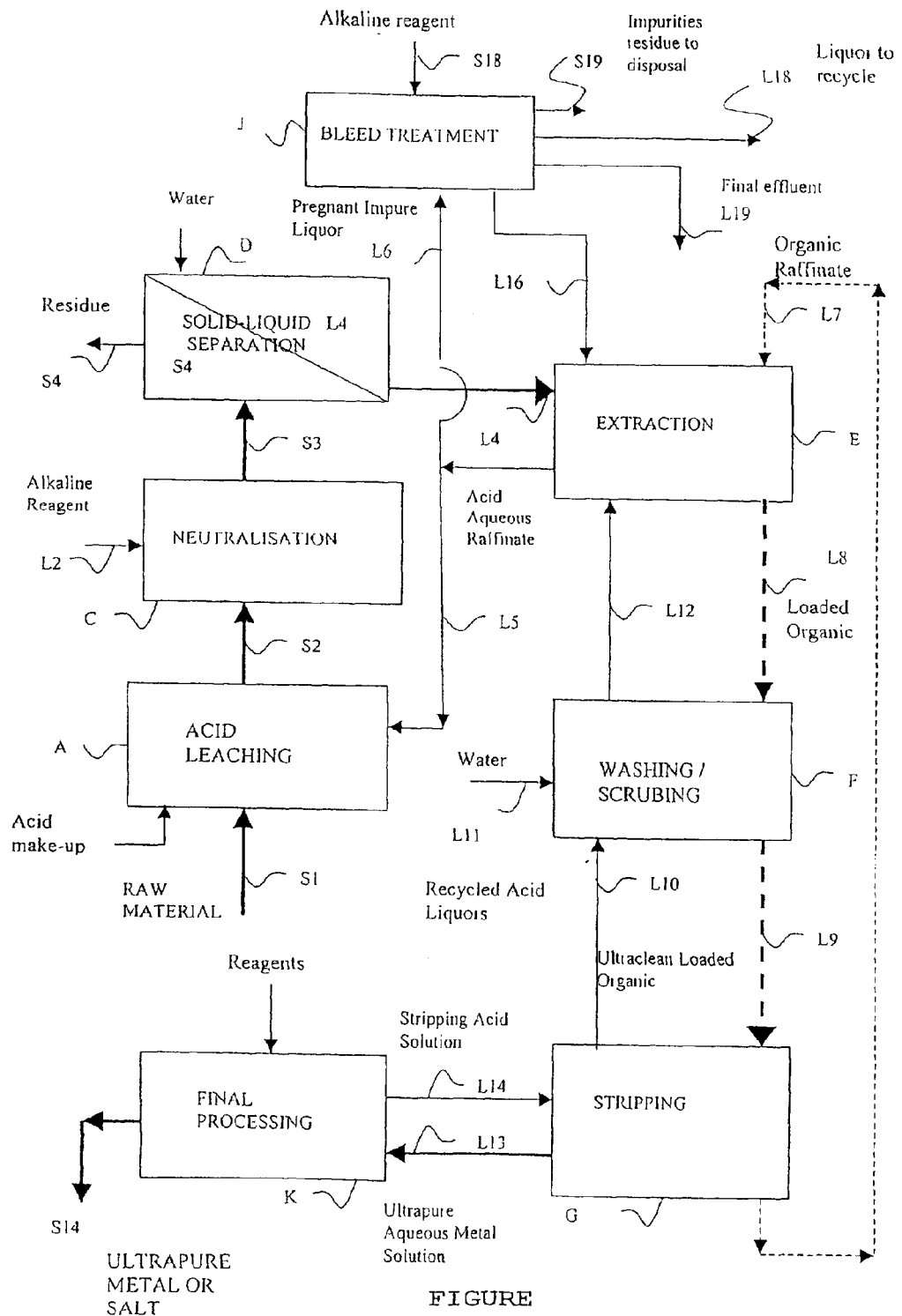
FIGURE

PROCESS FOR THE CONTINUOUS PRODUCTION OF HIGH PURITY ELECTROLYTIC ZINC OR ZINC COMPOUNDS FROM ZINC PRIMARY OR SECONDARY RAW MATERIALS

DESCRIPTION OF THE INVENTION

The invention relates to an improved production process for high purity electrolytic zinc or zinc compounds, by an hydro-metallurgical process starting from zinc containing primary or secondary raw materials.

STATE OF THE ART

Several patented processes exist concerning the hydrometallurgical treatment of primary or secondary zinc containing raw materials. These processes, operating via the deployment of appropriate means, are targeted toward the production of electrolytic zinc or of zinc compounds. The ultimate goal of these processes is to obtain zinc of the highest degree of purity.

The RLE process (Roasting, Leaching and Electrowinning) treats primary raw materials normally zinc sulfide concentrates. In a first stage, roasting, zinc oxides (calcine) and $SO_2$ are obtained, which $SO_2$ needs to be converted into sulfuric acid in a dedicated sulfuric acid production plant. The calcine, impure zinc oxide, is then leached with a sulfuric acid solution (spent electrolyte), and after a solid-liquid separation the liquor is purified. The purification of the liquor is conducted by cementation with zinc powder. This purification step is however difficult in order to achieve the extremely low level of impurity level concentration required by the electrowinning. Then, the purified liquor is sent to zinc electrowinning to obtain zinc plates, which are sent to melting and casting.

Other processes use, in a first step, the acid leaching of the raw material in order to dissolve the zinc, then, in a second step, selectively extract the dissolved zinc present in the solution by means of an acid organic solvent which acts as (for some of them with pH control) extraction media, and in a third step, treat the acid organic solvent loaded with zinc in order to recover the zinc in the form of an aqueous solution and to regenerate the acid organic solvent for further recycling.

In such existing processes, the aqueous acid solutions and the extraction acid organic solvent are recycled in various/different steps of the process.

A first process (U.S. Pat. No. 4,401,531) describes the acid hydro-metallurgical treatment of zinc containing secondary raw materials like zinc alkaline solids, or impure solutions of suphate or chloride medium, for example smelting slags, galvanizing ashes, alkaline zinc dross, impure zinc oxides or hydroxides, impure zinc electrolytes, leaching effluents, etc.

This process describes the combination of means, which comprise the extraction of dissolved zinc (present in the solution resulting from the acid leaching) by means of a solution of acid organic solvent. In this process, the acidity produced during the zinc extraction, in order to recover an acid solution, is recycled back to the leaching step.

The disadvantages of this process are linked to the fact that the range of raw material considered for the feed is solely restricted to secondary raw materials and to the fact that the zinc purity is considered as insufficient for some specific end use and deserves to be improved. Also the range of operation of the process is narrow (conditions such as temperature, residence time, acid concentration and zinc concentration).

Another patent (U.S. Pat. No. 4,552,629) describes a process similar to the previously described process (U.S. Pat. No. 4,401,531) although the zinc is produced as a direct electrogalvanizing zinc product instead of plates from zinc electrowinning.

The main object of this (U.S. Pat. No. 4,552,629) hydrometallurgical process for the recovery of zinc of primary or secondary origin is to deploy a combination of steps similar to the previous patent (U.S. Pat. No. 4,401,531). The acid leaching is constituted by a blend of sulfuric acid and hydrochloric acid. The aqueous solution resulting from the leaching (rich in dissolved zinc) is treated by means of an acid organic solvent acting as zinc extraction media. Then the zinc loaded acid organic solvent is itself treated by an acid solution (stripping) which allows to recover the ion zinc in a new aqueous phase and the regeneration of the acid organic solvent. However, due the absence of the proper organic washing before the stripping, the zinc rich aqueous solution which originates from the stripping is not engendering a zinc of the highest purity.

Another hydrometallurgical process (U.S. Pat. No. 4,572,771) for the recovery of specific zinc containing raw material, i.e. raw materials containing zinc, lead and iron, consists of an hydrochloric acid leaching step, conducted in cascade and in counter flow, by means of an hydrochloric acid solution. The pH of the acid leaching media evolves from <1 (in the first leaching stage) to a value ranging between 2 and 4 at the last stage (in the last leaching stage); The leaching temperature is ranging between 30 and 90° C.

At the end of the leaching step, the aqueous leaching solution (zinc loaded solution and cleaned from leaching residues) is subjected to an oxidation step with recycled chlorine and then subjected to the precipitation of the lead and iron by means of calcium hydroxide.

The zinc loaded aqueous solution (recovered after the lead and iron removal) is subsequently treated by an extraction acid organic solvent. The zinc loaded organic solvent is itself treated by water or an acid solution such as HCl solution from zinc electrowinning, in order to recover the zinc and regenerate the organic solvent into an unloaded organic acid for further recycling.

However, in this process, the raw material feed is very specific. Furthermore, a hydrochloric acid leaching solution and an oxidation with recycled chlorine from electrowinning are used. The solvent extraction section has no dedicated purification stage and consequently, the organic solvent is not capable of producing zinc of the highest purity. The electrowinning is not a conventional sulfate electrowinning; it needs a membrane or diaphragm separation between electrodes and the process conditions are totally different to the conventional electrowinning case. Addressing the corrosion issues and the chlorine safe operational conditions needs special equipment, and require expensive materials. It does not lead to an economical exploitation.

On basis of cited documents, the different considered processes mentioned above demonstrate that they are, in general, dedicated to very specific raw material feed for which they have been conceived.

Consequently, such processes cannot simultaneously perform in their treatment of zinc containing raw materials of different origin, whether primary or secondary raw materials, and, at the same time, perform at high recovery yield and deliver zinc or zinc compounds of extreme purity, from the moment they are, in essence, raw material focused.

RESULTS OF THE INVENTION

A first result is a hydro-metallurgical process for the production of zinc of very high purity starting from raw materials containing zinc of primary or secondary origin, solids or liquids, and containing as well silica, aluminum, iron, calcium, in variable quantities, as well as other impurities, for instance, magnesium, manganese, potassium, copper, nickel, cadmium, cobalt, chlorine, fluorine, . . .

Another result is a process, which allows the production of very high purity zinc in a metallic form by electrolysis or in a form of chemical compounds such as for instance, zinc salts by for instance crystallization.

Another result is a process, which allows the extraction of almost the entirety of the zinc contained in the raw material, if the feed is in a solid state, through a more complete acid leaching step, at atmospheric pressure and under relatively modest temperatures.

Another result is a loop process. The first loop combines the acid leaching of the raw material (when the considered raw material is a solid), the neutralization, followed by the extraction of the dissolved zinc, through an organic acid solvent, and the recycling of the acid to the leaching stage. The second loop is the organic loop, which transports the zinc from extraction to stripping through scrubbing/washing and the acid in the opposite direction.

The third loop is the combination of the stripping and electrowinning stages, using the acidity generated in the zinc electrowinning, to strip the zinc of the organic.

SUMMARY OF THE INVENTION

The invention concerns a continuous production process for very high purity electrolytic zinc metal or zinc compounds starting from zinc containing raw materials to be extracted by a hydro-metallurgical treatment, which consists of the following steps:

a) if the raw material is solid, leaching said raw material by an acidic aqueous solution in order to dissolve the zinc, b) optionally, depending upon the raw material, if the leaching residue have any valuable component, a solid/liquid separation would be included after leaching, c) neutralizing the aqueous solution or pulp, or the zinc containing solution when the raw material in liquid form, d) solid/liquid separating of the zinc rich aqueous solution from the solids (inert residues and or precipitates from the neutralization step), e) extracting the zinc contained in the pregnant aqueous solution by an organic acidic solvent, f) purifying the zinc rich loaded organic solvent coming from the extraction step e), g) stripping the ionic zinc from the zinc loaded organic solvent by an acidic solution, h) recovering the zinc from the zinc containing acidic aqueous solution coming out the stripping stage by electro-winning and/or crystallization and/or precipitation, characterized in that:

for solid raw material case, the acid leaching of the raw material, according to step a) is conducted in "n" leaching zones, arranged in a cascade mode, "n" being at least equal to 2, the neutralization of the zinc rich aqueous solution produced in the leaching step, according to step c), is conducted in "p" zones arranged in a cascade mode, "p" being at least equal to 2, the purification (scrubbing/washing) treatment of the zinc loaded organic solvent, according to step f), is conducted in "q" physical and/or "r" chemical purification successive zones, organic and aqueous streams operating in counter current mode, "r"+"q" being at least equal to 1, and in that, eventually, a small flow of the aqueous phase from the leaching, neutralization, extraction steps, is treated, in order to adjust the water and/or alkaline elements balance and/or increase the zinc recovery, and to control the building up of dissolved impurities.

DETAILED DESCRIPTION OF THE INVENTION

The raw material, considered for the process described in this invention, contains zinc to be extracted, and can originate from primary or secondary sources like solids or liquids. Solids such as zinc oxide ores, carbonates ores, silicates ores, sulphates, calcines, slags of smelting, galvanization residues, electric arc furnace dust, Waelz oxides, chemical precipitates or others, which all contain impurities in variable quantities like silicium, aluminum, iron, calcium, magnesium, manganese, potassium, copper, cobalt, nickel, cadmium, chlorides, fluoride and other elements and compounds. The zinc content in these solids, expressed by weight, in this different feed can go from about 3 to 80%. For liquid raw materials, the ion zinc could be present as sulfate including without limitation several and variable quantities of chloride, nitrate, silicate, etc., not necessarily minorities.

The solid raw material, before being used as feed in the process according to the invention, is finely ground at the adequate particle size such as for instance, a maximum particle size of 2 millimeter.

According to the process described in the invention, the acid leaching of the solid raw material according to step (a) is conducted under agitated flow leaching reactors. Depending upon the characteristics and plant capacity a plurality of leaching zones arranged in a cascade mode for which the number of zone is at least equal to 2, and preferentially situated between 3 and 8 is required.

The acid leaching solution used for the leaching of the solid raw material is a recycled solution coming from step e) corresponding to the zinc extraction, which contains at least one strong acid and which, since a make-up of acid is necessary, therefore, can also be a blend of acids. The acid or the acids constituting the aqueous leaching solution are chosen in a group constituted by sulfuric acid, hydrochloric acid, nitric acid, hydrofluoric acid or their mixtures in several ratios. In the particular case where the aqueous leaching solution contains only one acid, this acid is preferentially sulfuric acid.

The aqueous leaching solution used for the leaching of the zinc containing raw material is highly acidic, containing, in general from 0.1 to 5 mol/l of acidity ($H^+$) independently of its origin, including the acid make up to compensate for the raw material alkalinity.

The leaching step of the solid raw material, by the acid leaching solution, takes place at a pH ranging from 0 to 3, at the end, in each leaching zone, under a total residence time of 0.5 to 7 hours and preferably of 0,5 to 2 hours, and under a temperature below 95° C., and preferentially, between 45° C. and 65° C.

The temperature measured in each cascade leaching zone is generally set and maintained at a given level. However, it is possible that the leaching temperature be set at a precise level for each considered zone of the cascade leaching step, according to a increasing temperature setting scale allowing extra strong leaching of the raw material considered.

Concerning the pH, its value can evolved in a controlled manner from leaching zone to leaching zone, the first-leaching zone, having preferentially a pH of about 0.5, while the last zone would record a pH of approximately 2.5.

From the moment the zinc loaded leaching solution or pulp leaves the last "n" leaching zone, which also contains soluble impurities, it is subjected to a neutralization treatment. If the solid residue can be subjected to a separate valorization treatment, it will be extracted from the stream at this stage without being subjected to the neutralization step.

According to the characteristics of the feed material and plant capacity, the neutralization treatment uses a plurality of zones in cascade, the number of "p" zones being at least equal to 2, but preferentially between 3 and 8.

The neutralization reagent is one among classical alkaline chemicals, preferably cheap, like those belonging to the hydroxides, carbonates, dicarbonate, particularly, calcium carbonate or hydroxide compounds, like more specifically, limestone or lime.

The neutralization treatment in the "p" zones of cascade neutralization of the leaching solution is conducted at a temperature close to the one found at the end of the leaching step, that is maximum around 95° C., but preferentially between 45° C. and 65° C. Residence time has the same magnitude as the one corresponding to the leaching step, that is between 0,5 and 7 hours, but preferentially between 1 and 4 hours. At the end of this neutralization step, the pH of the neutralized leaching solution is brought up to level between 3 and 5.

The introduction of the neutralization alkali reagent can be done fully into one of the neutralization cascade zones, specifically the first zone, or partly in at least two zones among the "p" zones, according to best options.

Furthermore, the final pH post the neutralization, measurable in the last "p" zone can progress in a controlled manner up to the set value for every zone, and this from zone to zone.

Past neutralization, a liquid/solid separation treatment takes place, allowing separating the zinc rich neutralized it liquid solution, while separating the non-leached solid residues, which are eliminated.

The zinc rich neutralized liquid solution is sent to the extraction step e), where zinc is extracted by the mean of an organic solvent.

In order to remove the soluble impurities from the zinc rich neutralized liquid solution, and/or from the raffinate, (aqueous zinc unloaded solution originating from extraction), a possibility is to treat a fraction of one or both of this streams by means of an alkali reagent. This treatment allows to adjust the water and/or alkaline element balance, increase the zinc recovery (preventing zinc loss) and control the building up of dissolved impurities. This fraction of the zinc rich neutralized liquid solution and/or raffinate represents at most 25% of the volume of said solution, and preferentially, 3% to 15% in volume.

The flow of zinc rich neutralized aqueous solution in step d) is put in contact at step e) with an acid organic solvent, which role is to allow the zinc extraction, the solution been subjected to the ionic chemical equilibrium reaction described below:

$$Zn^{2+} + 2HR \leftrightarrow ZnR_2 + 2H^+ \qquad (1)$$

In this chemical equation, HR represents said organic acid extraction solvent, and $ZnR_2$ represents the organic solvent loaded with zinc.

HR is generally chosen among a group constituted by alkyl phosphoric acid, alkyl phosphonic acid, alkyl phosphinic acid, having the capability of extracting the zinc, but preferentially in a group constituted by di-(2-ethylhexyl) phosphoric acid (D2EHPA), di-(2-ethylhexyl) phosphonic acid, ED and di-(2,4,4 trimethylpentyl) phosphinic acid.

For its deployment in the zinc extraction step, HR is dissolved in an organic compound originating from petroleum cut, such as for instance kerosene. The concentration of this organic reagent in the kerosene is between 5% to 75%, and preferentially between 30% and 50%.

During the step in which the neutralized aqueous zinc rich solution is put in contact with the organic extraction solvent, according to well known counter current conditions, in order to extract the zinc, in compliance with step e), $H^+$ ions are liberated, (on basis of two $H^+$ ions for each $Zn^{2+}$ ion). The acid aqueous solution from the extraction step, which contains residual zinc and a significant amount of dissolved impurities, is recycled in step a) as the leaching solution for the leaching of the solid raw material.

The ratio between the organic phase and the aqueous phase in extraction stage (ratio O/A) is selected according to process conditions in order to achieve the proper chemical and physical behavior, generally between 0.5 and 6 and preferentially between 1 and 3.

The zinc loaded organic extraction solvent ($ZnR_2$) coming out of the extraction stage, contains co-extracted and entrained impurities (in minor amount). These impurities must be fully eliminated, in order for the product, (zinc metal or zinc compound) resulting from the process according to the invention, to be of extreme purity. This is why the zinc loaded organic solvent is subjected to a treatment which can be described as a extreme purification step, step f) in order to remove all remaining and still present traces of impurities.

Practically, this scrubbing/washing purification treatment of the zinc loaded extraction solvent is a combination of successive physical and chemical treatments.

This purification treatment (scrubbing/washing) is conducted in a plurality of counter current purification treatment zones. According to the raw material characteristics, the number of "q" physical and/or "r" chemical purification successive zones, ("r"+"q" being at least equal to 1):

The number "q" of such physical purification treatment (scrubbing) zones being at least equal to 2 and preferentially comprised between 1 and 4.

The number "r" of such chemical, purification treatment (washing) zones being at least equal to 2 and preferentially comprised between 1 and 4.

The physical (scrubbing) treatment of the organic phase, required in order to avoid the carry over of aqueous entrainment in the organic phase, is achieved by the means of a flow of acidified water, in an organic/aqueous rate between 5 and 50.

The chemical (washing) treatment is conducted by means of an acidic recycling solution (which may contain dissolved zinc), containing from 10 g/l to 100 g/l of zinc and from 0.1 to 1 g/L of equivalent $H^+$.

It is based on a stripping by displacement of the impurities co-extracted (Me) in the organic phase ($MeR_2$) by an additional extraction of zinc, achieving a purer organic solution and according the equilibrium reaction:

$$MeR_2 + Zn^{2+} \longleftrightarrow ZnR_2 + Me^{2+} \qquad (2)$$

(Me having the valence of the metallic impurity).

Thanks to the deployment of such combination of different means, and selected special process conditions, the zinc loaded organic solvent, $ZnR_2$, is achieving extremely high purity levels.

Only special cations such as $Fe^{3+}$ are extracted preferentially to the zinc but not easily stripped. For this, a bleed of the organic flow, originating from step g), is sent to the regeneration stage, where this small organic flow is treated with a hydrochloric acid solution with acidity between 2 to 10 mol/l, preferentially 4 to 8 mol/l to strip those ions, in order to regenerate the organic while maintaining the proper quality level. This organic bleed is recycled to the main organic circuit and the spent hydrochloric acid aqueous solution either to leaching or to a hydrochloric acid recovery system.

From thereon, the organic zinc rich solvent coming out of this intense purification step can be subjected to the stripping of its zinc content, by means of an acidic recycling solution, (said solution being itself of extremely high purity), in a step g) according to the chemical equilibrium reaction (3)

$$ZnR_2 + 2H^+ \longleftrightarrow 2HR + Zn^{2+} \qquad (3)$$

The acid organic solvent, by now scavenged from its zinc, is recycled to the extraction step e) while the "ultra-pure" aqueous zinc rich solution is fed into the last step of the process according to the invention, where ultra-pure zinc is recovered according to any of the follow-ng processes: electro-winning and/or crystallization and/or precipitation and/or any other known process. In the electrowinning case the zinc purity being greater than 99.995%, meeting the best quality classification of the London Metal Exchange, and following the maximum quality of the standard norms (ISO-752 Special High Grade (SHG) B6-95a of ASTM, UNE 37-301-88, Zn 1 of BSL), and for other product or salts, the equivalent purity definition.

The final aqueous solutions from the solvent extraction system: raffinate from extraction, acid solution from stripping and spent hydrochloric acid from regeneration are treated by active charcoal to remove the organic entrainment in those aqueous streams and minimizing the organic losses.

EXAMPLE

The invention will be better understood through the description of an example for the process according to the invention, schematically presenting a flow diagram describing the steps a) to h) of the process according to the invention, which will be represented by the capital letters (A) to (J).

This example concern the recovery of zinc metal of extreme purity:

By means of:
leaching of a zinc containing raw material, achieved by the use of an aqueous acidic solution containing a blend of sulfuric acid (representing 95% by weight equivalent of $H^+$ in the blend) and hydrochloric acid (representing 5% by weight equivalent of $H^+$ in the blend)
extraction of the dissolved zinc by an organic acid solvent (D2EHPA).
stripping of the zinc by acidic treatment of the zinc loaded acid organic solvent and regeneration and recycling of said solvent.

The solid raw material serving as feed ($S_1$) contained 25% by weight of zinc. Among the main impurities accompanying the zinc, there were: silicium (13% by weight), aluminum (5% by weight), iron (3% by weight), calcium (5% by weight), and other impurities (magnesium, manganese, potassium, copper, cobalt, nickel, cadmium, chlorine, fluorine) which represent with the sulphate and others, the balance to 100% by weight.

The raw material (53 t/h), ground to a particle size 100% less than 1.29 millimeter, a K80 less than 500 microns, and put into a slurry form, has been introduced in step (A) of the leaching. This stage contains 4 leaching cascade zones. The raw material is introduced at the same time as the recycling leaching acid aqueous liquor ($L_5$), which proper acidity (in the recycled acid solution), is obtained by acid make-up in order to compensate for the raw material alkalinity.

The pH of the leaching media has been maintained all along the attack to a value less than 1.4.

The temperature of the attack media has been set to a constant level of around 55° C. and the time necessary to reach ultimate leaching of the raw material was of 2 hours.

The neutralization of the media ($S_2$) coming form the leaching step has been carried out in 4 neutralization cascade zones (C), by the simultaneous introduction of limestone ($L_2$), so that the pH of the media ($S_3$) at the end of the neutralization (C) is set to the value of 4.2. Between the first and the fourth zone of cascade neutralization, the temperature has been maintained at around 53° C.

After the liquid/solid separation (and cake washing) in (D), the solid residue $S_4$ has been eliminated and the rich zinc (but impure) solution ($L_4$) is sent to extraction (E) of the zinc.

During this zinc extraction by the organic acid solvent (organic raffinate), $L_7$, the aqueous phase is acidified according to reaction (1), and the aqueous produced, acid aqueous raffinate, ($L_4$), is separated in two flows ($L_5$) and ($L_6$), ($L_5$), being sent to leaching (A), and ($L_6$) being sent to Bleed treatment (J).

The immure solution ($L_6$) forms the bleed of the leached impurities enabling to maintain the impurity percentage circulating in the cycle at the proper level. The impure solution ($L_6$) is treated in (J) by means of an alkaline agent ($S_{18}$) (limestone or lime) in the appropriate treatment in order to recover, deplete and recycle ($L_{16}$), to stage (E) (or and (C)) the zinc contained. The solution ($L_{18}$), released from the leaching impurities, is partially reintroduced into the process cycle.

The bleed treatment which incorporates a solid liquid separation yields two effluents, liquid, ($L_{19}$) and solid ($S_{19}$) which are sent to disposal.

The solution ($L_4$) that constitutes the flow intended for zinc extraction is treated in several steps in extraction step (E) by the organic extraction solvent, ($L_7$), (D2EHEA) by ion exchange according to equation (1) previously mentioned. Each extraction step comprising an intimate contact zone facilitating the zinc extraction, between each aqueous solution and each extraction organic solvent and a separation zone of the two liquids post extraction.

The zinc loaded organic solvent ($L_8$) is sent to step (F) of extreme purification, which comprises two purification successive zones. One zone is a physical purification step to remove the impurities present in the aqueous solution entrained in the organic stream, the other a chemical purification step, in order to remove, at the proper conditions, all the co-extracted impurities, according to the reaction (2). The purification (washing/scrubbing) is conducted by an aqueous acid recycling solution ($L_{10}$)—still containing some zinc—and water ($L_{11}$). After this stage, the washing liquor with the impurities is sent back to the extraction (E) in the form of one stream ($L_{12}$).

The zinc loaded organic solvent ($L_9$) coming out of the purification (F) is very pure and practically free of remaining impurities. It is then sent to the step (G) for stripping of the zinc and regeneration of the organic extraction solvent according to equation (3) previously mentioned. This step is conducted by means of an aqueous acid recycling solution ($L_{14}$) containing 3.4 g/l of $H^+$ equivalent. A small flow of the stripped organic flow around (3%) is sent to regeneration stage where the iron/aluminum co-extracted in the organic stream (not stripped before) are now removed from the organic stream using hydrochloric acid solution.

The aqueous solution ($L_{13}$) originating from step (G) constitutes the ultra pure zinc containing solution from which an ultra pure zinc may be obtained by known means like electrowinning or crystallization or any other known means.

All the impurities initially present in the raw material, like silicium, aluminum, iron, calcium, magnesium, potassium, copper, cobalt, nickel and others have been eliminated in the different process steps according to the invention. The recovered zinc has purity beyond 99.995% by weight in the metal case, or for other product or salt, the proportional equivalent quality.

The numerical data of the different process steps according to the invention have been summarized in the following chart, displayed according to the attached flow sheet (FIG. 1).

TABLE

Main streams characteristics

| | | Zinc wt % or g/L | Impurities* wt % or g/L | Flow-rate m³/h or t/h | Acidity conc. in g/L of $H^+$ | pH | Temperature ° C. |
|---|---|---|---|---|---|---|---|
| Leaching (A) | | | | | | | |
| S1 | | 25% | 26.2% | 53 t/h | — | — | 45 |
| L5 | | 15 g/L | 4.2 g/L | 430 m3/h | 0.76 | <1.5 | 45 |
| Acid make-up | | — | — | 9.8 m3/h | 36.7 | — | 25 |
| Neutralization (C) | | | | | | | |
| S2 | Solid phase | 2% | 40% | 28.7 t/h | — | — | 57 |
|  | Liquid phase | 43 g/L | 9.1 g/L | 440 m3/h | 0.1 | 1.6 | 57 |
| L2 | Solid phase | — | — | 52.2 t/h | — | — | 42 |
| S3 | Solid phase | 1.4% | 36.2% | 48.6 t/h | — | — | 53 |
|  | Liquid phase | 40.3 g/L | 4.4 g/L | 472 m3/h | — | 4.2 | 53 |
| Bleed Treat. (J) | | | | | | | |
| L6 | | 15 g/L | 4.2 g/L | 112 m3/h | 0.76 | — | 45 |
| S19 | Solid phase | <0.1% | 28% | 11.4 t/h | — | — | 44 |
| L18 | | <0.1 g/L | 2.7 g/L | 144 m3/h | — | — | 44 |
| Zinc extract. (E) | | | | | | | |
| L4 | | 40 g/L | 4.2 g/L | 475 m3/h | 0.76 | — | 51 |
| L7 | | 0.5 g/L | 0.35 g/L | 1064 m3/h | — | — | 41 |
| L8 | | 13 g/L | (0.35)** 0.5 g/L (0.35)** | 1064 m3/h | — | — | — |
| Washing/ Scrubbing (F) | | | | | | | |
| L9 | | 13 g/L | 0.35 g/L | 1064 m3/h | — | — | — |
| L10 | | 12 g/L | (0.35)** | 12.6 m3/h | 3.4 | — | 38 |
| L11 | | (water) | 0.40 g/L | 40.6 m3/h | — | — | 25 |
| L12 | | 12 g/L | (0.24)** 1.9 g/L | 53.2 m3/h | 0.8 | — | 46 |
| STRIPPING (G) | | | | | | | |
| L13 | | 90 g/L | 0.40 g/L | 332 m3/h | 2.2 | — | 42 |
| L14 | | 50 g/L | (0.24)** 0.40 g/L (0.24)** | 332 m3/h | 3.4 | — | 38 |
| FINAL PROCESSING (K) | | | | | | | |
| S14 (Product) | | Ultra pure | <0.005% | 12.4 t/h Zn | — | — | — |

Notes
*Si + Al + Fe + Ca + Mg + Mn + Cu + Co + Ni + Cd + Cl + F
**Fe + Al (g/L)

What is claimed is:

1. A process for the continuous production of a top purity electrolytic zinc and zinc compounds of high purity, starting from zinc containing raw materials in at least one of solid and liquid states to be extracted by a hydro-metallurgical treatment which comprises the following steps:
   a) leaching any raw material in the solid state by an acidic aqueous solution in order to dissolve the zinc therein so as to produce a zinc containing solution,
   b) neutralizing the zinc containing solution of step a,
   c) separating a zinc rich aqueous solution from solids subsequent to neutralizing and combining any liquid state raw material with said zinc rich aqueous solution,
   d) subsequent to step c extracting zinc contained in the zinc rich aqueous solution by an organic acidic solvent to form a zinc rich loaded organic solvent,
   e) purifying the zinc rich loaded organic solvent coming from the extraction step d,
   f) stripping zinc from the zinc rich loaded organic solvent from step e utilizing an acidic solution,
   g) recovering the stripped zinc from the zinc containing acidic aqueous solution coming out of step f by use of a process chosen from the group consisting of electrowinning, crystallization, and precipitation, and further including the steps of:
   h) neutralizing any of the zinc containing solution produced in step b in "p" zones arranged in a cascade mode, "p" being at least equal to 2,
   i) purifying the zinc rich loaded organic solvent according to step e in at least one purifying zone chosen from the group of purifying zones consisting of "q" physical and "r" chemical purification streams operating in counter current mode.

2. A process according to claim 1, characterized in that the to be extracted zinc containing raw materials are at least partially solid materials and contain from 3 to 80% by weight of zinc, wherein the zinc to be extracted is in a chemical form selected from the group consisting of zinc oxides, zinc salts and zinc metal.

3. The process according to claim 1, characterized in that the raw materials are in the form of zinc impure aqueous solutions, including non zinc cations and anions.

4. The process according to claim 1, characterized in that the leaching acidic aqueous solution contains at least one mineral acid.

5. The process according to claim 4, characterized in that the leaching acidic aqueous solution contains a mixture of acids.

6. The process according to claim 1, characterized in that the leaching acidic aqueous solution is chosen from the group consisting of sulfuric acid, hydrochloric acid, nitric acid and hydrofluoric acid.

7. The process according to claim 1, characterized in that the total leaching acidic aqueous solution contains between 0.1 g/l and 5 mol/l of equivalent $H^+$.

8. The process according to claim 1, including the step of maintaining a pH of the leaching produced zinc containing solution between 0 and 3 during step a.

9. The process according to claim 1, characterized in that the leaching is conducted over a residence time of 0.5 to 7 hours.

10. The process according to claim 1, characterized in that the leaching is conducted at a temperature not exceeding 95° C.

11. The process according to claim 1, characterized in that the neutralization according to step b of the zinc containing solution originating from the leaching, is conducted preferably in a number "p" of cascade zones of neutralization, wherein the number "p" is in the range from 3 to 8.

12. The process according to claim 11, characterized in that a pH of the zinc containing solution resulting from the leaching is in the range from 3 to 5 at the end of the neutralizing step b.

13. The process according to claim 11, characterized in that the temperature of the zinc containing solution during the neutralizing step is not greater than 95° C.

14. The process according to claim 11, characterized in that neutralizing step is conducted over a residence time of 0.5 to 7 hours.

15. The process according to claim 1 characterized in that a part of the neutralized zinc rich aqueous solution is treated with an alkali reagent in order to adjust at least one of the balance of water in the aqueous solution and the balance of alkaline elements in the aqueous solution.

16. The process according to claims 15 characterized in that the part of the neutralized zinc rich aqueous solution treated with an alkali agent represents at most 25% of the volume of said solution.

17. The process according to claim 1, including the step of subjecting the zinc rich loaded organic solvent to a physical and chemical counter current purification treatment conducted in a plurality of "q" physical and "r" chemical zones ("r"+"q" being at least equal to 2).

18. The process according to claim 17, characterized in that the treatment in at least one physical zone comprises the washing with an acidified water solution of the zinc rich loaded organic solvent in a ration of organic to aqueous in a range between 5 and 50.

19. The process according to claim 17, characterized in that the treatment in at least one chemical zone utilizes an aqueous zinc acid solution containing from 10 g/l to 100 g/l of zinc and from 0.1 to 1 g/L of equivalent $H^+$.

20. The process according to claim 1, including the step of bleeding a portion of the loaded organic solvent originating from step f to a regeneration stage, for treatment with a hydrochloric acid solution with acidity concentration between 2 to 10 mol/l.

21. The process according to claim 1 including the step of:
   a) subjecting solid raw materials to leaching in a plurality of leaching zones in a cascade mode.

22. The process according to claim 21, characterized in that the acid leaching according to step a is conducted in a number "n" of cascade zones with n being in the range from 2 to 8.

23. A process for the continuous production of a high purity zinc and zinc compounds, starting from zinc containing raw materials in at least one of solid and liquid states to be extracted by a hydro-metallurgical treatment which comprises the following steps:
   a) leaching any raw material in the solid state by an acidic aqueous solution in order to dissolve the zinc therein, to produce a zinc containing solution,
   b) neutralizing the zinc containing solution of step a,
   c) separating a zinc rich aqueous solution of step b from solids subsequent to neutralizing and combining with any raw materials in a liquid state,
   d) extracting zinc contained in the zinc rich aqueous solution utilizing an organic acidic solvent to form a zinc rich loaded organic solvent,
   e) purifying the zinc rich loaded organic solvent from the extraction step d,
   f) stripping zinc from the zinc rich loaded organic solvent from step e utilizing an acidic solution, g) recovering the stripped zinc from the zinc containing acidic aqueous solution from the stripping stage f by use of a process chosen from the group consisting of electrowinning, crystallization, and precipitation, and further including the steps of:

h) neutralizing the zinc containing solution according to step b in "p" zones arranged in a cascade mode, "p" being at least equal to 2, i) purifying the zinc rich loaded organic solvent according to step e in at least one purifying zone chosen from the group of purifying zones consisting of "q" physical and "r" chemical purification streams operating in counter current mode, and j) extracting the zinc contained in the neutralized zinc rich aqueous solution by an organic acid solvent in kerosene chosen from the group consisting of alkyl phosphoric acids, alkyl phosphonic acids, alkyl phosphinic acids.

24. The process according to claim 23, characterized in that the organic acid solvent is chosen from the group consisting of di-(2-ethylhexyl) phosphoric acid (D2EHPA), di-2 ethylhexil phosphonic acid and di-(2,4,4 trimethylpentyl) phosphinic acid.

25. The process according to claim 23, characterized in that the ratio between an organic solvent phase and an aqueous solution liquor phase is in the range from 0.5 to 6.

26. In a process for producing high purity zinc and zinc compounds from various zinc containing raw materials wherein zinc is acid leached from the raw materials, thereafter neutralized and thereafter extracted using an organic solvent; the improvement comprising the step of:

a) neutralizing the leached zinc in a plurality of neutralizing stages in a cascade mode.

27. In a process for producing high purity zinc and zinc compounds from various zinc containing raw materials wherein zinc is extracted using an organic solvent; the improvement comprising the step of:

a) subjecting the extracted zinc in the organic solvent to a plurality of purification zones operating in counter current mode.

28. The process according to claim 27 including:

a) choosing said purification zones from the group consisting of physical zones, chemical zones and combinations of physical zones and chemical zones.

29. The process according to claim 28 including:

a) utilizing at least two physical zones.

30. The process according to claim 28 including:

a) utilizing at least two chemical zones.

* * * * *

UNITED STATES PATENT AND TRADEMARK OFFICE
CERTIFICATE OF CORRECTION

PATENT NO.    : 6,869,520 B1
DATED         : March 22, 2005
INVENTOR(S)   : Daniel Martin San Lorenzo et al.

It is certified that error appears in the above-identified patent and that said Letters Patent is hereby corrected as shown below:

Title page,
Insert item:
-- [30]   Foreign Application Priority Data
December 17, 1999 (ES) Spain        P9902777
December 1, 2000 (WO)               PCT ES00/00458 --.

Signed and Sealed this

Sixth Day of September, 2005

JON W. DUDAS
*Director of the United States Patent and Trademark Office*